US010652381B2

(12) United States Patent
Yamkovoy et al.

(10) Patent No.: US 10,652,381 B2
(45) Date of Patent: May 12, 2020

(54) COMMUNICATIONS USING AVIATION HEADSETS

(71) Applicant: Bose Corporation, Framingham, MA (US)

(72) Inventors: Paul G. Yamkovoy, Acton, MA (US); George Sean Garrett, Sherborn, MA (US); Naganagouda B. Patil, Ashland, MA (US); Matthew Neil Ruwe, Hopedale, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/238,259

(22) Filed: Aug. 16, 2016

(65) Prior Publication Data

US 2018/0054508 A1   Feb. 22, 2018

(51) Int. Cl.
*H04M 1/60* (2006.01)
*H04R 1/10* (2006.01)
(Continued)

(52) U.S. Cl.
CPC .......... *H04M 1/6066* (2013.01); *H04B 1/385* (2013.01); *H04L 67/104* (2013.01); *H04M 1/72577* (2013.01); *H04M 1/72597* (2013.01); *H04R 1/028* (2013.01); *H04R 1/1041* (2013.01); *H04R 3/02* (2013.01); *H04R 3/04* (2013.01); *H04B 2001/3866* (2013.01);
(Continued)

(58) Field of Classification Search
CPC ........... H04M 1/6066; H04M 1/72577; H04M 1/72597; H04B 1/385; H04B 2001/3866; H04L 67/104; H04R 1/028; H04R 3/02; H04R 3/04; H04R 2420/05; H04R 2420/07
See application file for complete search history.

(56) References Cited

U.S. PATENT DOCUMENTS 6,954,639 B1   10/2005   James
7,668,308 B1   2/2010    Wurtz
(Continued)

FOREIGN PATENT DOCUMENTS

CN   103004094 A   3/2013
CN   104170403 A   11/2014
(Continued)

OTHER PUBLICATIONS

International Search Report and Written Opinion; PCT/US2017/046684; dated Nov. 28, 2017; 14 pages.
(Continued)

*Primary Examiner* — Erica Navar
(74) *Attorney, Agent, or Firm* — Fish & Richardson P.C.

(57) ABSTRACT

The technology described in this document can be embodied in a method that includes receiving a first signal representative of audio captured using a microphone in communication with an analog communication module. The method also includes determining that a first feedback signal from the analog communication module includes a sidetone associated with the audio captured by the microphone, and responsive to determining that the first feedback signal includes the sidetone, generating, by one or more processing devices, at least one control signal that affects operations of a digital communication module.

23 Claims, 9 Drawing Sheets

(51) Int. Cl.
*H04B 1/3827* (2015.01)
*H04M 1/725* (2006.01)
*H04R 1/02* (2006.01)
*H04R 3/02* (2006.01)
*H04R 3/04* (2006.01)
*H04L 29/08* (2006.01)
*H04R 27/00* (2006.01)

(52) U.S. Cl.
CPC ............ *H04R 1/1008* (2013.01); *H04R 27/00* (2013.01); *H04R 2420/05* (2013.01); *H04R 2420/07* (2013.01)

(56) References Cited

U.S. PATENT DOCUMENTS

| | | | |
|---|---|---|---|
| 7,742,740 | B2 | 6/2010 | Goldberg et al. |
| 7,865,137 | B2 | 1/2011 | Goldberg et al. |
| 7,916,877 | B2 | 3/2011 | Goldberg et al. |
| 7,917,082 | B2 | 3/2011 | Goldberg et al. |
| 8,023,663 | B2 | 9/2011 | Goldberg |
| 8,170,486 | B2 | 5/2012 | Olofsson |
| 8,391,792 | B2 | 3/2013 | Glezerman et al. |
| 8,433,243 | B2 | 4/2013 | Sharma |
| 8,706,038 | B2 | 4/2014 | Sharma |
| 9,191,988 | B2 | 11/2015 | Newham |
| 2007/0225035 | A1* | 9/2007 | Gauger, Jr. ......... H04M 1/6066 455/553.1 |
| 2008/0057857 | A1* | 3/2008 | Smith .................. H04R 1/1033 455/3.05 |
| 2008/0201138 | A1* | 8/2008 | Visser ................. G10L 21/0208 704/227 |
| 2010/0087218 | A1 | 4/2010 | Hannosh et al. |
| 2010/0303014 | A1* | 12/2010 | McMullin ............ H04W 84/18 370/328 |
| 2016/0150575 | A1 | 5/2016 | Anderson et al. |

FOREIGN PATENT DOCUMENTS

| | | |
|---|---|---|
| CN | 104247454 A | 12/2014 |
| CN | 104301823 A | 1/2015 |
| GB | 2 382 952 | 12/2005 |
| JP | 2010-273249 | 12/2010 |
| WO | WO 2008/028175 | 3/2008 |

OTHER PUBLICATIONS

Chinese Office Action in Chinese Appln. No. 201780063725.7, dated Dec. 13, 2019, 8 pages.

Japanese Office Action; Application No. 2019-508916; dated Mar. 2, 2020; with English Translation; 6 pages.

* cited by examiner

COMMUNICATIONS USING AVIATION HEADSETS

TECHNICAL FIELD

This disclosure generally relates to aviation headsets.

BACKGROUND

Aviation headsets are used by pilots in commercial and general aviation to communicate over aircraft intercom and radio systems. Such headsets may also have wireless communication capabilities that allow two pilots to communicate with each other directly.

SUMMARY

In one aspect, this document features a method that includes receiving a first signal representative of audio captured using a microphone in communication with an analog communication module. The method also includes determining that a first feedback signal from the analog communication module includes a sidetone associated with the audio captured by the microphone, and responsive to determining that the first feedback signal includes the sidetone, generating, by one or more processing devices, at least one control signal that affects operations of a digital communication module.

In another aspect, this document features a headset for use in aviation. The headset includes circuitry configured to interface with an analog communication module external to the headset. The headset also includes a digital communication module configured to communicate with a wireless-enabled device, and a controller. The controller includes one or more processing devices, and is configured to receive a first signal representative of audio captured using a microphone in communication with the analog communication module. The controller is also configured to determine that a first feedback signal from the analog communication module includes a sidetone associated with the audio captured by the microphone, and responsive to determining that the first feedback signal includes the sidetone, generating, at least one control signal that affects operations of the digital communication module.

The document also features a machine-readable storage device having encoded thereon computer readable instructions for causing one or more processors to perform various operations. The operations include receiving a first signal representative of audio captured using a microphone in communication with an analog communication module, and determining that a first feedback signal from the analog communication module includes a sidetone associated with the audio captured by the microphone. The operations also include, responsive to determining that the first feedback signal includes the sidetone, generating at least one control signal that affects operations of a digital communication module.

The above aspects can include one or more of the following features.

The analog communication module can be associated with an intercom system, and the digital communication module can be associated with a headset. The digital communication module includes a peer-to-peer (P2P) communication engine. The P2P communication engine can include a Bluetooth® radio. The at least one control signal can be configured to disable the digital communication module. The at least one control signal can be configured to disable generation of a digital sidetone signal by the digital communication module. An absence of a sidetone associated with the audio captured by the microphone can be determined in a second feedback signal from the analog communication module; and responsive to determining the absence of the sidetone, one or more functions of the digital communication module can be enabled. Enabling the one or more functions can include enabling the digital communication module to communicate with a remote device. This can include enabling the microphone to provide signals to the digital communication module. This can also include determining that the microphone is disconnected or disabled, and responsive to determining that the microphone is disconnected or disabled, enabling a second microphone to provide signals to the digital communication module. The controller can be configured to determine that the headset is being accessed for use in a phone call, and responsive to determining that the headset is being accessed for use in a phone call, disable one or more functions of the digital communication module such that the headset is usable for the phone call. The controller can also be configured to determine that the headset is not being used for the phone call, and responsive to determining that the headset is not being used for the phone call, automatically enable the one or more functions of the digital communication module that were disabled to make the headset usable for the phone call.

Various implementations described herein may provide one or more of the following advantages.

By detecting a sidetone signal in analog audio coming from the aircraft intercom system, processing circuitry of an aviation headset can be configured to determine whether the intercom microphone is squelched. This in turn may allow for adjusting the digital communication circuitry of the headset to reduce unwanted interference between the digital communication system and the aircraft intercom system, thereby potentially improving the audio quality and providing private peer-to-peer communication via the digital communication system (without sending the microphone signal to the intercom system). This may also enable a user of the headset to make private phone calls utilizing a Bluetooth®-enabled digital communication system. In addition, this may allow for activating or de-activating a digital communication channel between multiple aviation headsets. For example, if a sidetone signal is detected in the audio coming through the aircraft intercom system, a determination may be made that the intercom microphone is not squelched out, and accordingly, a digital sidetone coming through a Bluetooth® module of the headset can be disabled, for example, to prevent undesirable interference between the intercom audio and the digital sidetone. By contrast, if a sidetone signal is not detected in the audio coming through the aircraft intercom system, a determination may be made that the intercom microphone is squelched out or disconnected, and accordingly, a Bluetooth® communication link between the pilot and co-pilot may be enabled, for example, to maintain communication between the two pilots when the intercom system is otherwise unavailable for communication. Such controlling of a digital communication module based on processing analog audio may allow for improved user-experience and better integration between analog and digital communication modules in an aviation headset. In some implementations, this may also allow for maintaining a substantially seamless communication channel between two pilots whether or not the intercom system is in use or otherwise unavailable.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another.

Figure 1:
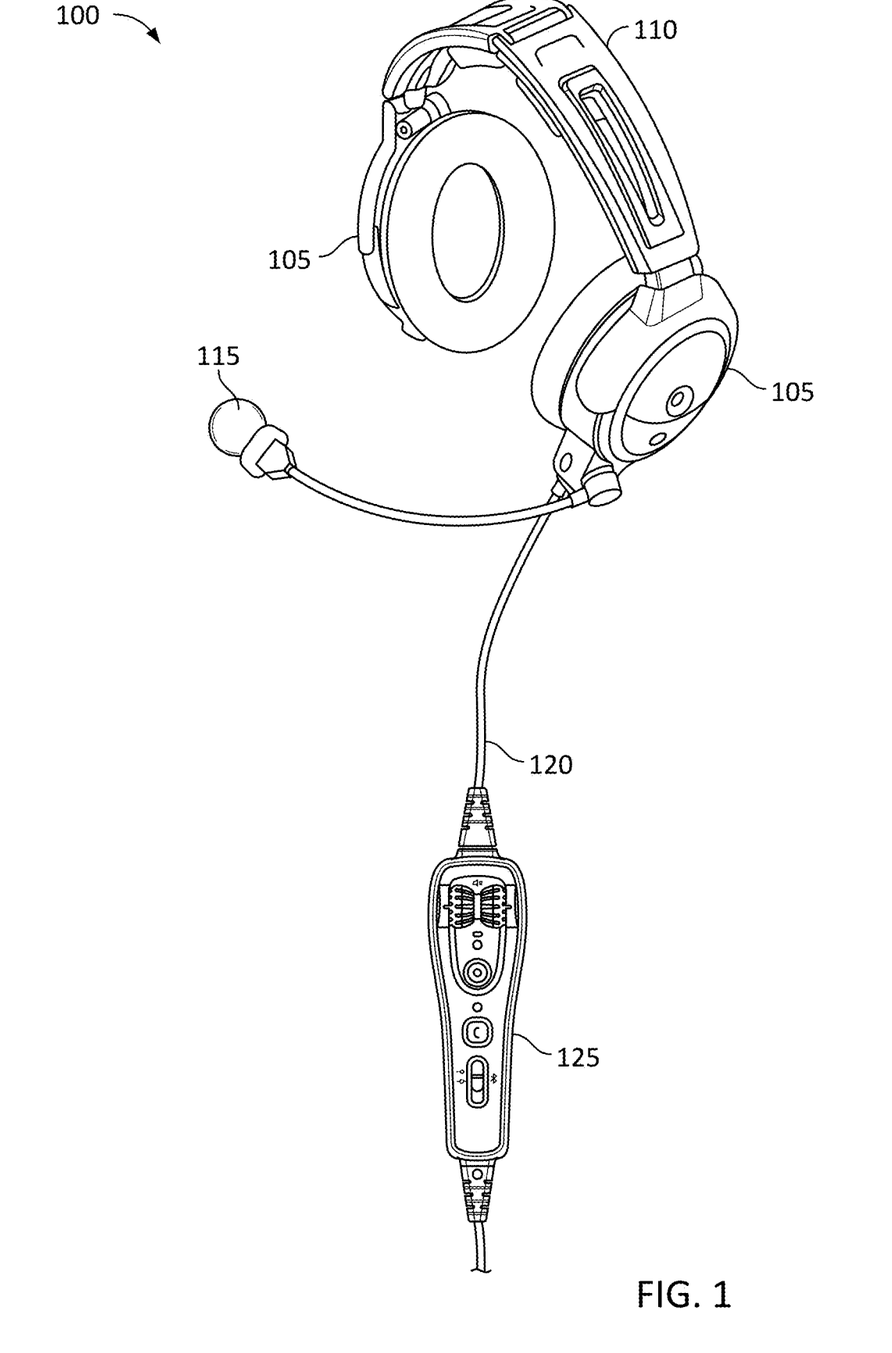
FIG. 1 shows an example of an aviation headset.

An example of an aviation headset 100 is shown in FIG. 1. The headset 100 includes an ear-cup 105 on each side, which fits on, around, or over the ear of a user. Each of the ear-cups 105 houses acoustic transducers or speakers. The headset 100 also includes an over-the-head bridge 110 for connecting the two ear-cups 105. In some implementations, a microphone 115 (e.g., a boom microphone) may be physically connected to one of the ear-cups 105. The headset 100 can be connected to the aircraft intercom system using the connecting cable 120, which may also include a control module 125 that includes one or more controls for the headset 100. The analog signals to and from the aircraft intercom system are transmitted through the wired connection provided by the connecting cable 120. While the example in FIG. 1 illustrates an aviation headset that includes around-ear ear-cups, aviation headsets having other form-factors, including those having in-ear headphones or on-ear headphones, are also compatible with the technology described herein. In an example involving in-ear headphones, the over-the-head bridge may be omitted, and the boom microphone may be attached to the user via the headset or via a separate structure. Also, the term headset, as used in this document, includes various types of acoustic devices that may be used for aviation purposes, including, for example, earphones and earbuds.

Figure 2:
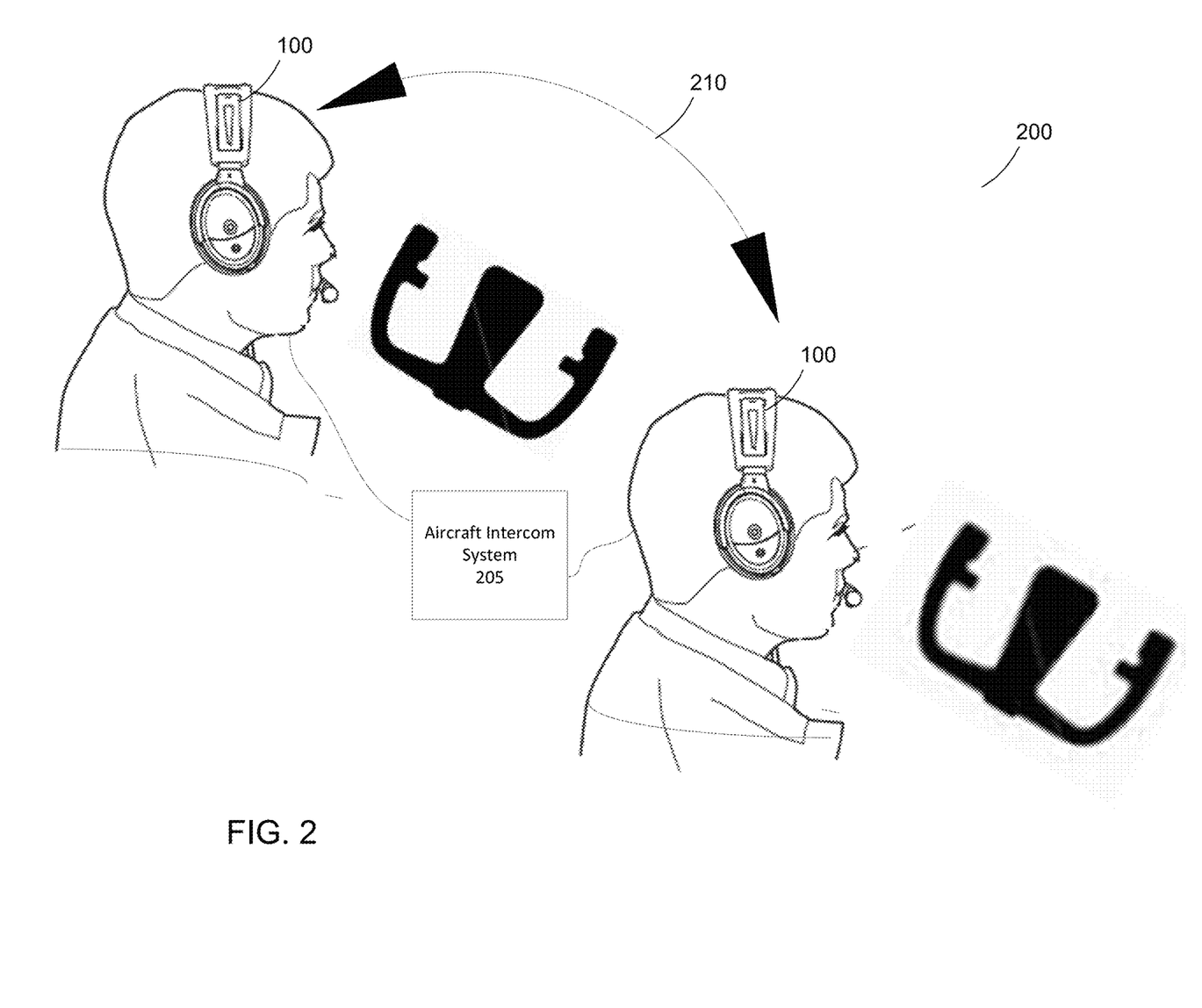
FIG. 2 illustrates two pilots communicating using headsets.

FIG. 2 shows an example of an environment 200 where two pilots are using corresponding headsets 100. Each of the headsets 100 are connected to the aircraft intercom system 205 used, for example, to communicate with the ATC. Because the headsets cover or are inserted into their ears, the pilots may need to communicate with one another through their corresponding headsets 100. When the pilots are speaking through the aircraft intercom system 205, each pilot can hear the other over the system 205. However, in some cases, a pilot may prefer to speak with the other pilot privately without transmitting the conversation over the aircraft intercom system 205. In some implementations, an aviation headset such as the headset 100 can also include a digital communication module such as a Bluetooth® module, which may be used for communicating with a corresponding module in another headset, for example, over a peer to peer (P2P) wireless channel 210 established between two headsets. Crew members within a cockpit may communicate with one another over such a wireless channel without using the aircraft intercom system 205. For example, a connection between the microphone 115 of a headset 100 and the aircraft intercom system 205 can be disabled to circumvent communicating through the aircraft intercom system. This can be referred to as squelching the microphone 115. In some implementations, when a microphone 115 is squelched out from the aircraft intercom system 205, the same microphone 115 can be used for communicating via the digital communication module. In some implementations, a separate microphone may be used for communicating via the digital communication module.

In some cases, concurrent communications over a digital communication module and the aircraft intercom system 205 can create interferences which may result in undesirable audible effects such as echoes. Because processing the signal from the aircraft intercom system 205 may be prohibited, or at least limited, by local aviation rules (e.g., as promulgated by the Federal Aviation Administration (FAA) in the United States), the digital communication module may need to be adjusted/controlled in order to reduce the chances of such interferences. The technology described herein may allow for enabling and/or disabling one or more functions of a digital communication module in accordance with a detected state of the headset. For example, when a pilot and a co-pilot are connected to the aircraft intercom system 205, and communicating over the system, a headset 100 can be detected to be in a state where a P2P connection via the digital communication is not needed (and may even be undesirable). However, if the headset 100 is detected to be in a state in which the headset is not communicating over the aircraft intercom system 205, a P2P connection (e.g., a wireless channel 210) may be established to maintain a link between two headsets.

The state-based control of headsets can be illustrated via the example of management of sidetones. Because the ears and/or ear canals of a user are covered, at least partially, by the headset 100, the user may not be able to hear his/her own voice, which in some cases may affect the naturalness of a conversation. Naturalness of a conversation may be improved, for example, by detecting the user's own voice as captured by a microphone 115, and playing it back as an audible feedback via an acoustic transducer of the headset 100. Such audible feedback is referred to as a sidetone. In an environment such as the one shown in FIG. 2, the sidetones can be of two types. The aircraft intercom system 205 can provide an analog sidetone when a user is communicating through the system 205. Also, when the user is communicating over the wireless channel 210, the corresponding digital communication module (e.g., a Bluetooth® module) may provide a digital sidetone. If both analog and digital sidetones are received at a headset 100, they may interfere with one another to degrade the quality of the feedback. In some implementations, the technology described herein may be used to disable the digital sidetone upon detecting the presence of a sidetone in the analog signal coming from the aircraft intercom system 205.

In some implementations, detecting the state of a headset 100 includes detecting whether the headset 100 is being used to communicate over the aircraft intercom system 205. However, because the aircraft intercom system 205 is typically an analog system, and/or the signals to and from the aircraft intercom system 205 can be processed only to a limited extent (e.g., due to regulations), detecting whether a pilot is using the system 205 can be challenging. In some implementations, this may be detected by determining whether a sidetone signal is present in the analog signal coming from the aircraft intercom system 205. For example, if a pilot has not squelched out the connection between the microphone 115 and the aircraft intercom system 205, the pilot's voice comes back as a sidetone through the system 205, and is played back through an acoustic transducer of the headset 100. One or more processing devices on the headset 100 can be configured to compare such an incoming signal to signals representing the pilot's voice, as picked up by the microphone 115. If the incoming signal is substantially similar to the signal picked up by the microphone 115 (e.g., as indicated by a correlation between the two signals), the processing devices may determine that a sidetone signal is present, and that the pilot has not squelched out the connection between the microphone 115 and the aircraft intercom system 205. On the other hand, if a sidetone is not detected in the analog signal coming from the aircraft intercom system 205, the processing devices may determine that a sidetone is not present and that the connection between the microphone 115 and the aircraft intercom system is squelched.

Figure 3:
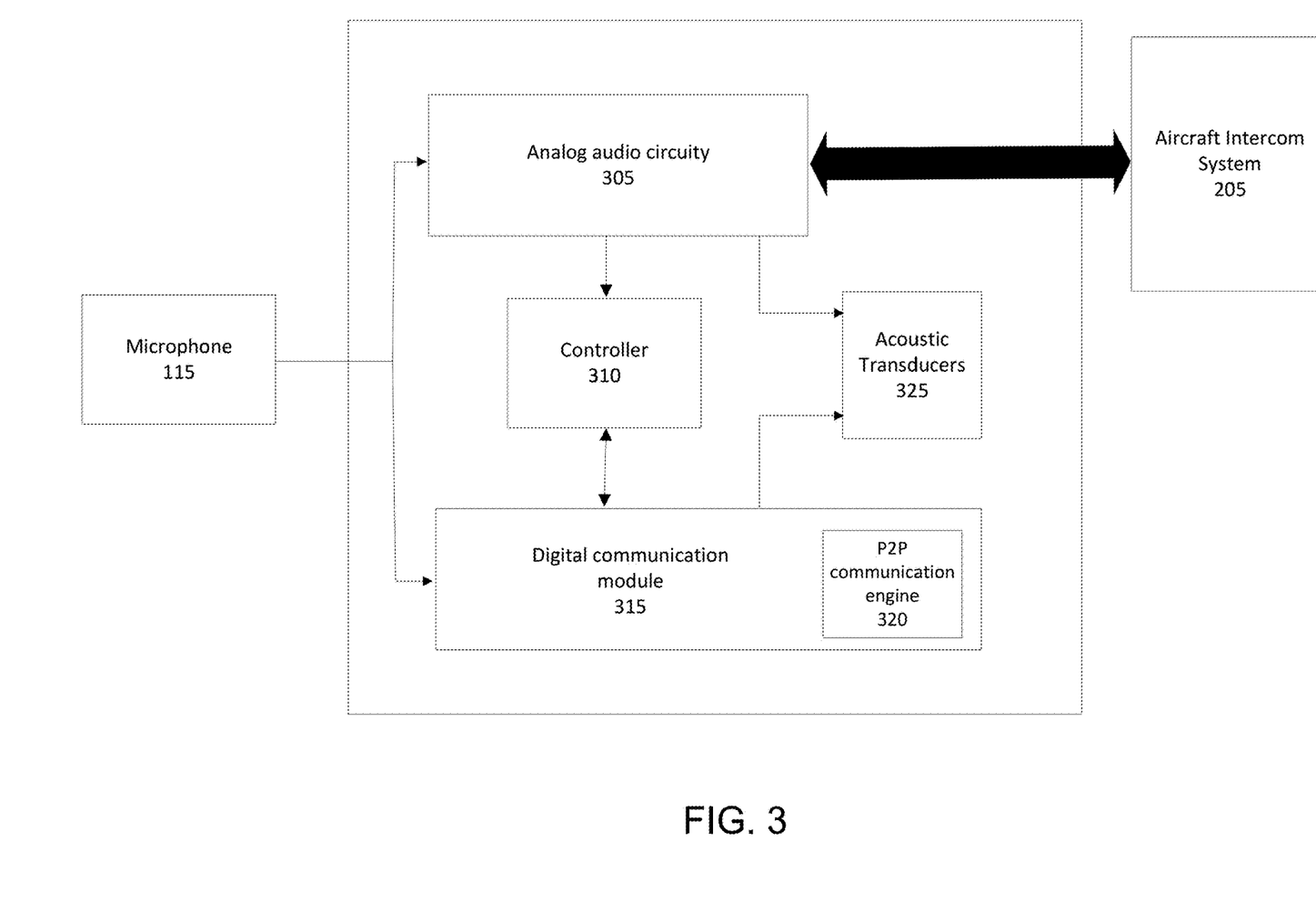
FIG. 3 is a block diagram illustrating various internal modules of an example implementation of an aviation headset.

FIG. 3 is a block diagram illustrating various internal modules of an example aviation headset 100, which can be used to implement state-based control in accordance with the technology described herein. In some implementations, the headset 100 includes analog audio circuitry 305 for communicating with the aircraft intercom system 205. The headset 100 also includes a digital communication module 315 for establishing a P2P communication with another connected device such as another headset. Both the analog audio circuitry 305 and the digital communication module 315 are connected to one or more acoustic transducers (e.g., speakers) 325 of the headset 100. The headset 100 also includes a controller that can be configured to coordinate the functions of the digital communication module, for example, in accordance with detected states of the analog audio circuitry. For example, if the controller detects the presence of a sidetone in a signal received from the analog audio circuitry 305, the controller can be configured to, for example, disable the digital communication module or disable the digital communication module from playing back a digital sidetone signal through the acoustic transducers 325.

In the example of FIG. 3, the same microphone 115 (e.g., a boom microphone) is connected to both the analog audio circuitry 305 and the digital communication module 315. In such cases, the microphone 115 can be used for communications over the digital communication module 315 when the connection between the microphone 115 and the aircraft intercom system 205 is squelched out or when the headset 100 is disconnected from the intercom system 205. For example, upon detection of a squelch, the controller 310 can be configured to route signals from the microphone 115 to the digital communication module 315. Similarly, when the headset 100 is disconnected from the intercom system 205, the controller 310 can be configured to internally bias the microphone 115 via an internal power source, and route signals from the microphone 115 to the digital communication module 315. Other microphone configurations may also be used. For example, the controller can be configured to select a secondary microphone (e.g., an in-line microphone connected to the acoustic transducers 325) upon detecting that the microphone 115 is disconnected or disabled. For example, if a boom microphone is used as the microphone 115, and is disconnected, for example from the headset 100 for the headset 100 to be used for a non-aviation purpose, the controller can be configured to detect such a disconnection, and switch to a secondary microphone accordingly. In some implementations, separate microphones may be used for the analog audio circuitry 305 and the digital communication module 315, and the controller 310 can be configured to switch between the microphones, for example, based on a detected state of the headset 100.

The analog audio circuitry 305 can include various circuit elements for interfacing with the aircraft intercom system 205. For example, the analog audio circuitry 305 can include at least portions of modulation/demodulation circuitry used for the communications through the aircraft intercom system 205. In some cases, the modulation/demodulation circuitry may be implemented as a part of the aircraft intercom system 205, and the analog audio circuitry 305 includes passive circuit elements for coupling the aircraft intercom system to the acoustic transducers 325.

The digital communication module 315 can include one or more elements for establishing a wireless channel (e.g., the channel 210, as described with reference to FIG. 2) and facilitating communications through such a channel. For example, the digital communication module can include a P2P communication engine 320 for establishing, and communicating over, a P2P link. In some implementations, the P2P communication engine includes one or more wireless protocol engines such a Bluetooth® engine. In such cases, the Bluetooth® engine can be configured to establish the wireless channel 210, for example, via a pairing-and-connecting process in cooperation with a corresponding Bluetooth® engine of another device (e.g., another headset 100). Upon establishment of such a P2P connection, the Bluetooth® engine can also be configured to communicate audio signals over the connection, for example, when the headsets are not communicating through the aircraft intercom system 205. While Bluetooth® is used as an example of the protocol used for the P2P connections, other communication protocols may also be used. Some examples include Bluetooth® Low Energy (BLE), Near Field Communications (NFC), IEEE 802.11, or other local area network (LAN) or personal area network (PAN) protocols.

In some implementations, the digital communication module can provide one or more functionalities for improving the audio quality associated with the communications through the digital communication module 315. For example, the digital communication module 315 can be configured to generate digital sidetones for improving the naturalness of audio when the headset 100 is communicating over the digital communication module. The controller 310 can be configured to enable/disable such digital sidetones in accordance with a detected state of the headset 100. For example, if a sidetone is detected in the signal coming from the aircraft intercom system 205, the controller 310 can be configured to generate a control signal that instructs the digital communication module to not generate a digital sidetone signal, for example to reduce the chances of audio quality being degraded due to the interference of the different sidetones.

The controller 310 can include one or more processing devices that can be configured to process audio signals received from the analog audio circuitry. In some implementations, the controller 310 can include an analog to digital converter (ADC) for pre-processing analog signals received from the analog audio circuitry 305. In some implementations, the controller 310 can be configured to adjust, disable, enable, or otherwise control the digital communication module in accordance with a state of the headset 100, as detected based on processing a signal received from the aircraft intercom system 205.

Figure 4:
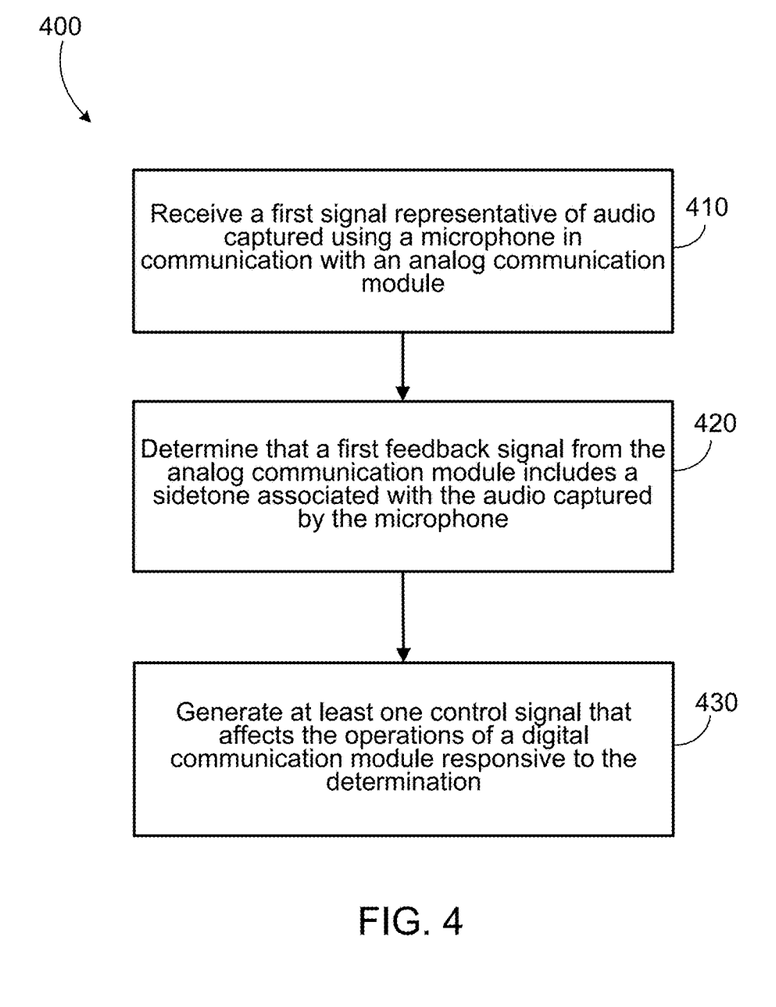
FIG. 4 is a flowchart of an example process of controlling a digital communication module of an aviation headset.

FIG. 4 is a flowchart of an example process 400 of controlling the digital communication module of the headset 100. In some implementations, at least a portion of the process 400 can be executed by the controller 310 depicted in FIG. 3. The operations of the process 400 include receiving a first signal representative of audio captured using a microphone in communication with an analog communication module (410). In some implementations, the microphone is a boom microphone connected to an aviation headset, and the analog communication module is an aircraft intercom system. In some implementations, the first signal can be stored in a storage location (e.g., memory buffer) accessible by the controller 310.

Operations of the process 400 also include determining that a first feedback signal from the analog communication module includes a sidetone associated with the audio captured by the microphone (420). This can include, for example, generating a digital signal from a portion of the first feedback signal, computing a correlation between the generated digital signal and at least a portion of the first signal, and determining that the first feedback signal from the analog communication module includes a sidetone if the calculated correlation satisfies a threshold condition. For example, a high correlation value between the two signals can indicate that the signal captured by the microphone is present in the audio received from the analog communication module, which in turn can indicate to the controller that the headset is being used for communicating over the analog communication module. On the other hand, if the calculated correlation is low and does not satisfy a threshold condition, an absence of a sidetone may be inferred, which in turn can indicate to the controller that the analog communication module is not being used.

In some implementations, a differential amplifier circuit can be used for determining that a first feedback signal from the analog communication module includes a sidetone associated with the audio captured by the microphone. For example, a ratio between the microphone signal and the received sidetone can be determined using the differential amplifier circuit. If the ratio remains substantially constant, it can indicate that the same signal has been returned via the sidetone. On the other hand, if the ratio is not substantially constant, it can indicate that a different signal (or no signal) has been returned via the sidetone.

Operations of the process 400 further include generating, by one or more processing devices, at least one control signal that affects operations of a digital communication module (430). The at least one control signal can be generated responsive to determining that the first feedback signal includes the sidetone. The digital communication module can be associated with an aviation headset, and can include, for example, a P2P communication engine such as a Bluetooth® radio. In some implementations, the at least one control signal is configured to disable the digital communication module, for example, to reduce potential interference with the analog communication module. In some implementations, particular functionalities of the digital communication module may be disabled. For example, the control signal can be configured to disable generation of a digital sidetone signal by the digital communication module.

In some implementations, one or more control signals can also be generated based on determining an absence of a sidetone. For example, responsive to determining the absence of the sidetone, one or more functions of the digital communication module can be enabled. This may be done, for example, to maintain constant communications between two pilots even when they are not communicating over an analog communication module such as an intercom. In some implementations, enabling the one or more functions can include enabling the digital communication module to communicate with a remote device. This can also include, for example, enabling a microphone to provide signals to the digital communication module. In some implementations, a controller can also be configured to determine that a microphone associated with the headset is disconnected or disabled, and the responsive to such determination, the controller may be configured to enable a second microphone to provide signals to the digital communication module.

Figure 5A:
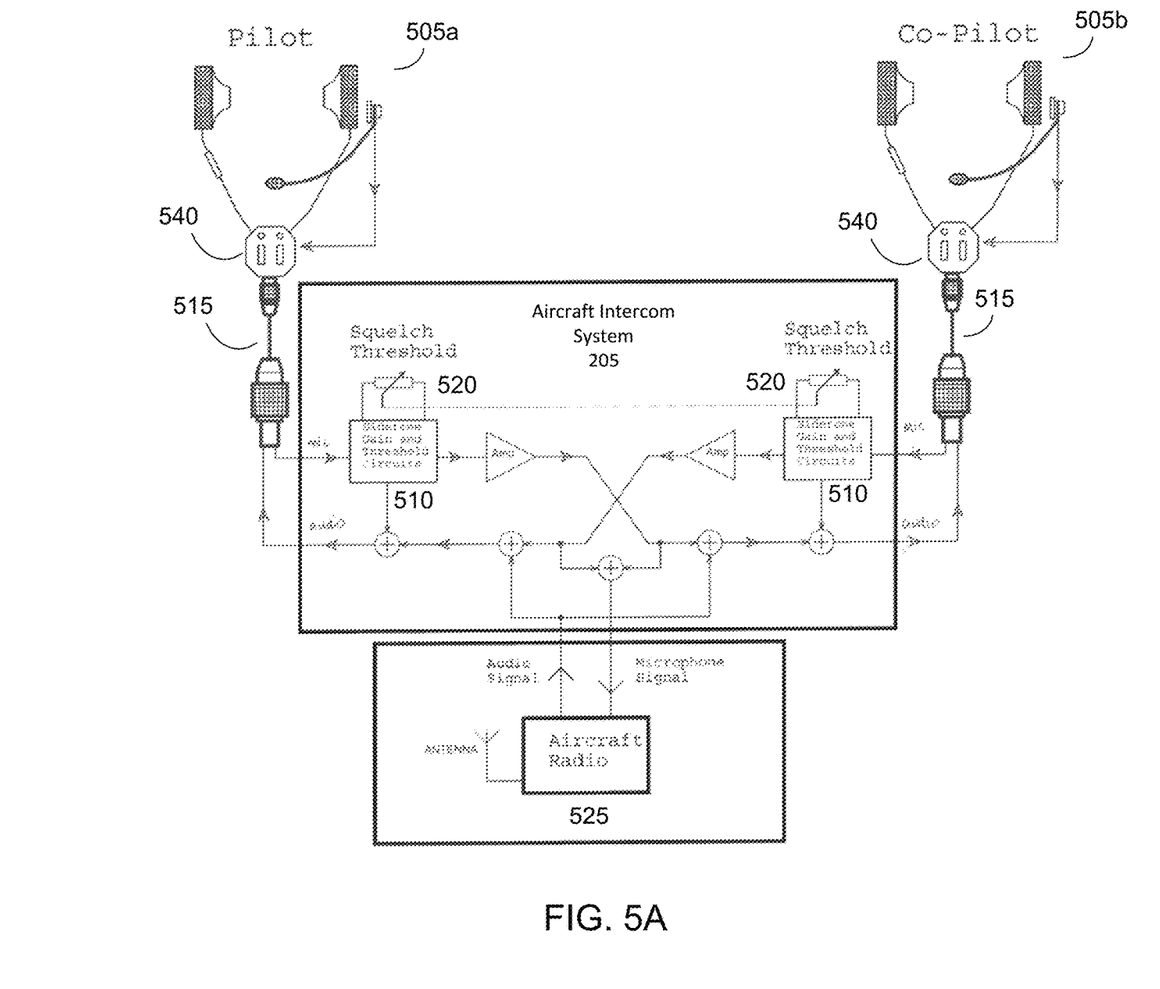
FIGS. 5A-5D are example block diagrams depicting two pilots communicating over headsets.

FIGS. 5A-5D are example block diagrams depicting two pilots communicating over headsets. Specifically, FIG. 5A illustrates a situation where the headset 505*a* of the pilot and the headset 505*b* of the co-pilot are connected to the aircraft intercom system 205, and the two headsets 505*a* and 505*b* are communicating via the aircraft intercom system 205. The headsets 505*a* and 505*b* are connected to the aircraft intercom system 205 via corresponding intercom cables 515. Microphone signals captured by the microphone of each headset 505 are passed to a corresponding sidetone gain and threshold circuit 510. The circuit 510 generates, based on the microphone signals, a sidetone signal, which is then fed back into the corresponding headset through the corresponding intercom cable 515. This enables the users (e.g., the pilot or the copilot) to hear their own speech through the corresponding headsets. The microphone signals captured via one headset (e.g., the headset 505*a*) are also passed through to the other headset (e.g., the headset 505*b*). The sidetone gain and threshold circuit 510 can also include a threshold adjustment circuit 520 that permits adjustment of the level of squelch. In some implementations, the threshold adjustment circuit 520 includes a potentiometer that can be used to set the threshold for the squelch. In some cases, the threshold adjustment circuit 520 may also be implemented using a digital circuit. The aircraft intercom system 205 can be connected to an aircraft radio 525, which permits communication outside of the aircraft (when available). It should be noted that while each of FIGS. 5A-5D show two headsets for illustrative purposes, more headsets may be involved in the communications through the aircraft communication system 205.

Figure 5B:
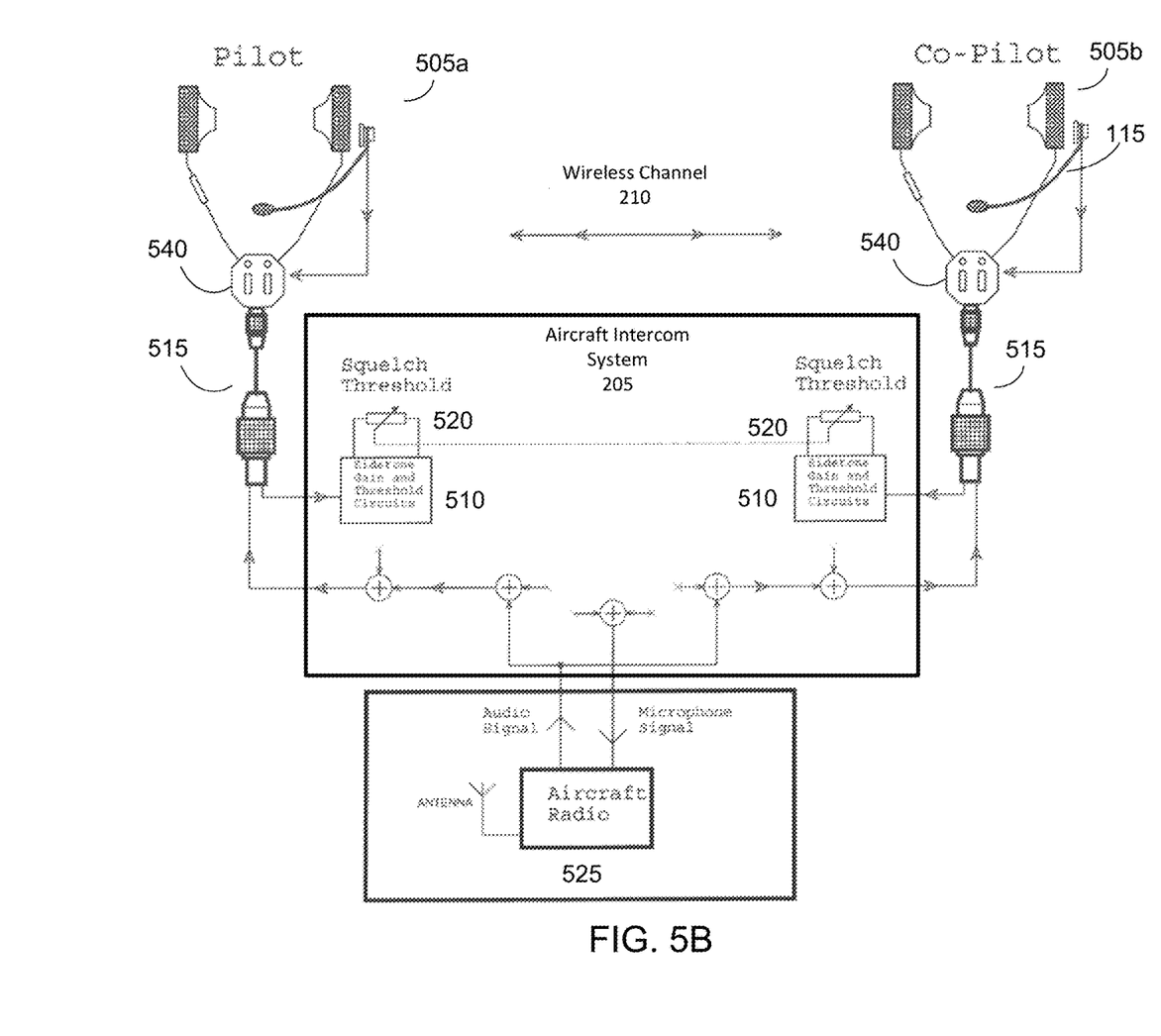

FIG. 5B illustrates the situation where the aircraft intercom system 205 is squelched. In this case, the microphone signals do not pass into the aircraft intercom system 205, and consequently no sidetone signal is generated or passed back to the headsets 505. Upon detection of a lack of sidetone, a P2P communication channel (e.g., the wireless channel 210) may be activated. It is important to note that even when the aircraft intercom system 205 is squelched, the audio coming in through the aircraft radio 525 is fed back to the headsets 505 because the headsets 505 are still connected to the aircraft intercom system. Consequently, the pilot and co-pilot are continuously connected to the aircraft radio 525 (even when the microphone is squelched) while also maintaining their own private communication link over the wireless channel 210.

Figure 5C:
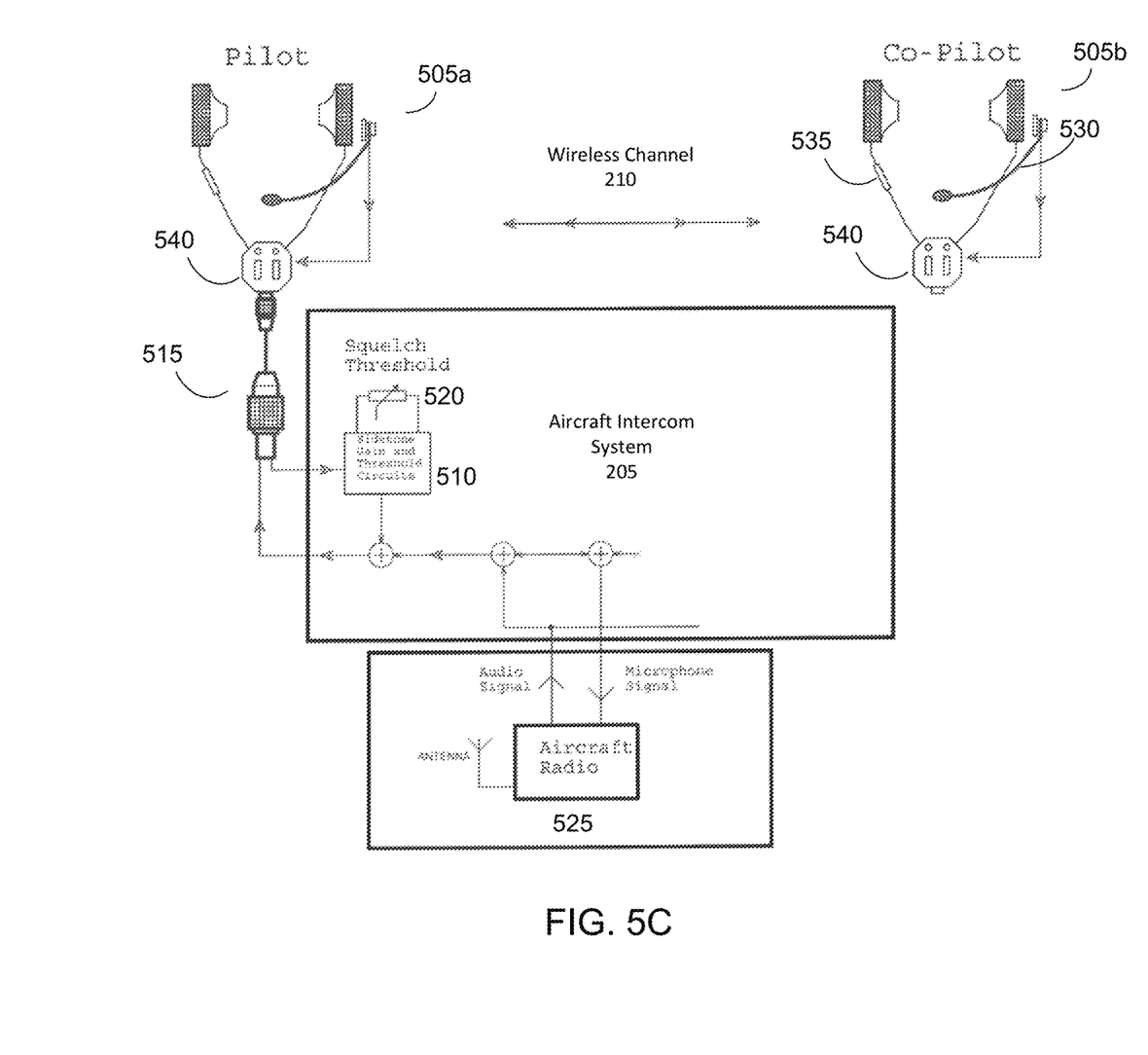

FIG. 5C illustrates the situation where the headset 505b of the co-pilot is disconnected from the intercom, but the headset 505a of the pilot remains connected to the aircraft intercom system 205. In such a case, the co-pilot's headset 505b detects the lack of sidetone, and in response, activates P2P communication between the two headsets. The pilot can therefore maintain radio communication via the intercom and a private communication link with the co-pilot over the wireless channel 210. In this scenario, the co-pilot may use the boom microphone 115 (which can be powered by a source internal to the headset or an external power source), or disconnect the boom microphone 115 from the headset 505b. In the latter case, the headset 505b can be configured to automatically switch to the secondary, in-line microphone 535 for the P2P communications. While not separately illustrated, the scenario in FIG. 5C would also apply (but in reverse) to the situation where the pilot is disconnected from the intercom, but the headset 505b of the co-pilot remains connected to the aircraft intercom system 205.

Figure 5D:
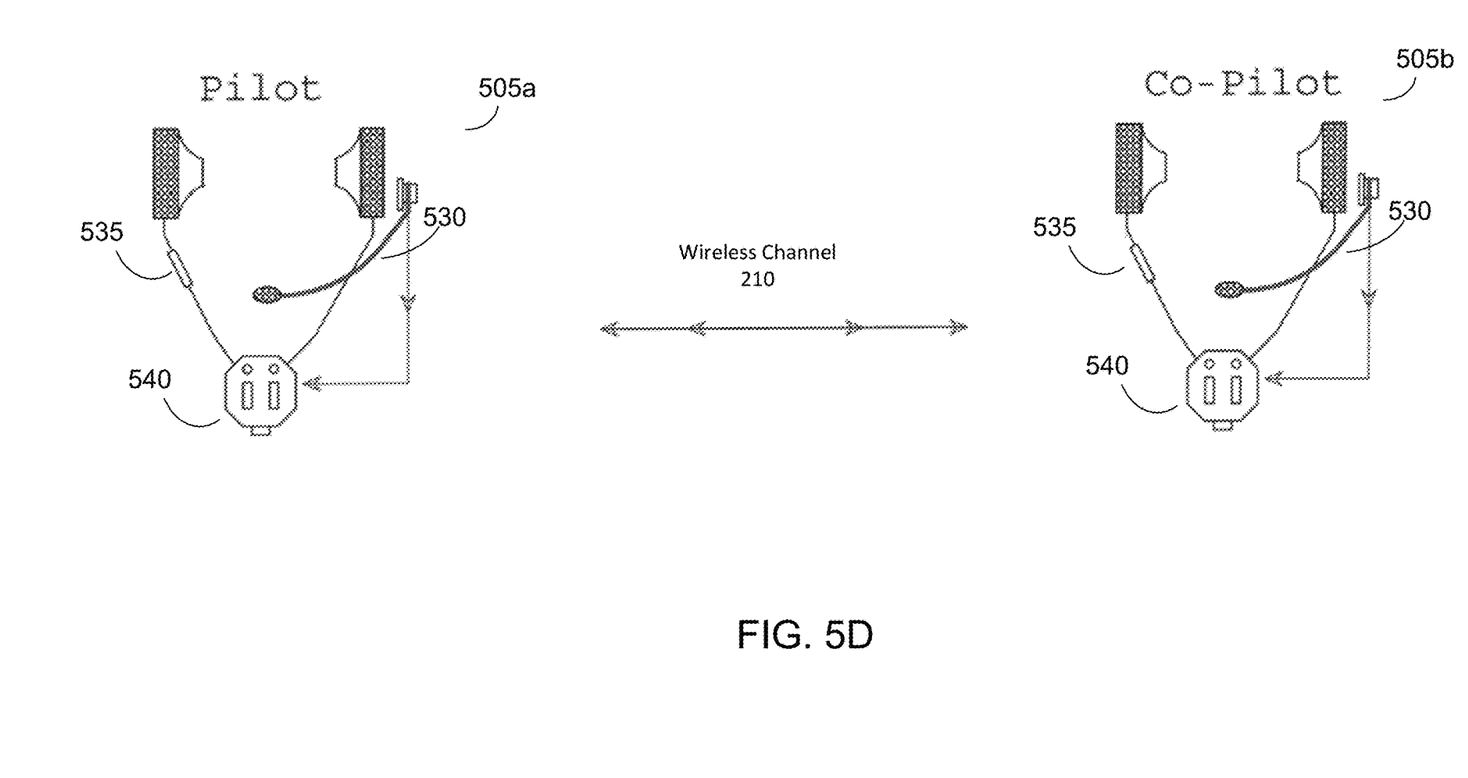

FIG. 5D illustrates the situation where the headsets of both the pilot and the co-pilot are disconnected from the aircraft intercom system 205. In such a situation, at least one of the headsets 505 detects the lack of sidetone, and in response, activates P2P communication between the two headsets. The users may then use either the boom microphone 530, or the secondary, in-line microphone 535, as described above.

Figure 6:
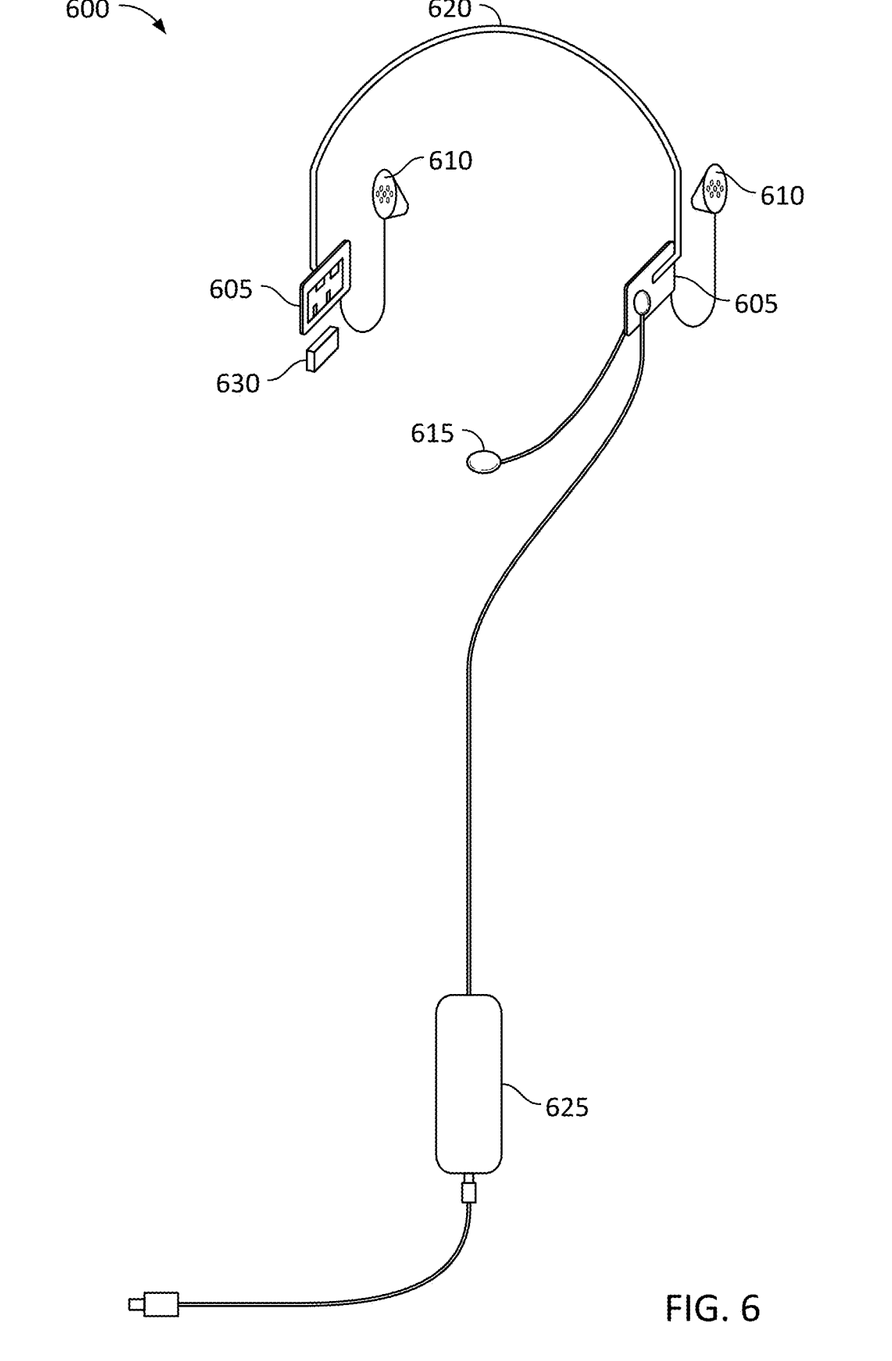
FIG. 6 is an example of an aviation headset.

Various types of headsets can be used to implement the technology described herein. One example form factor of such a headset is shown in FIG. 1. In some implementations, the circuitry associated with a headset may be disposed, at least in part, in a portable apparatus 540 (as shown in FIGS. 5A-5D) to which the acoustic transducers and microphone are connected. Other form factors are also possible, an example of which is depicted in FIG. 6. Specifically, FIG. 6 shows a headset 600 that includes support platforms 605 on either side to which acoustic transducers 610 are connected. The support platforms 605 can be physically connected to one another by an over-the-head or around-the-neck bridge structure 620. The support platforms 605 may rest against a user's head (e.g., above, behind and/or in front of a user's ears) when the headset 600 is in use, and may include a temperature management material, such as phase-change material (PCM) for absorbing body heat and/or providing a cooling sensation at the point of contact. An external microphone 615 (e.g., a boom microphone) can be attached (e.g., detachably at a pivot) to one of the support platforms, to the over-the-head or around-the-neck bridge structure 620, or alternatively to a separate over-the-head or around-the-neck support structure (not shown). In some implementations, the support platforms 605 can include at least a portion of the circuitry for the headset 600, for example, in the form of a printed circuit board (PCB). In some implementations, at least one of the support platforms include a termination block 630. The termination block may be used, for example, to complete the audio signal circuit on the ear cup opposite from the down cable. This is described in additional detail in U.S. Pat. No. 8,477,959, the entire content of which is incorporated herein by reference.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments and applications not specifically described herein are also within the scope of the following claims. For example, a headset in accordance with the technology described herein may be configured to receive a phone call while in P2P communication mode. For example, if one of the users communicating over a P2P mode receives a phone call, the corresponding headset can be configured to suspend the P2P communication link temporarily to allow the user to have a private phone call. In such cases, another module (e.g., a Bluetooth® module communicating with a phone) of the headset may be activated upon suspension of the P2P link. In some implementations, the P2P mode may automatically be resumed or reinstated upon termination of the phone call. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:
   receiving a first signal representative of audio captured using a microphone of an aviation headset in communication with an analog communication module;
   computing a correlation between (i) a portion of the first feedback signal and (ii) at least a portion of the first signal;
   determining that the computed correlation satisfies a threshold condition; and responsive to determining that the computed correlation satisfies a threshold condition, determining that a first feedback signal from the analog communication module includes a first sidetone associated with the audio captured by the microphone; and
responsive to determining that the first feedback signal includes the first sidetone, generating, by one or more processing devices, at least one control signal configured to disable one or more functions, of generation of a second sidetone by a digital communication module, determining an absence of sidetone in a second feedback signal from the analog communication module, and
responsive to determining the absence of sidetone in the second feedback signal, enabling one or more functions of the digital communication module.

2. The method of claim 1, wherein the analog communication module is associated with an intercom system, and the digital communication module is associated with a headset.

3. The method of claim 1, wherein the digital communication module comprises a peer-to-peer (P2P) communication engine.

4. The method of claim 3, wherein the P2P communication engine comprises a Bluetooth® radio.

5. The method of claim 1, wherein the at least one control signal is configured to disable the digital communication module.

6. The method of claim 1, wherein the at least one control signal is configured to disable generation of a digital sidetone signal by the digital communication module.

7. The method of claim 1, wherein enabling the one or more functions comprises enabling the digital communication module to communicate with a remote device.

8. The method of claim 1, further comprising:
enabling the microphone to provide signals to the digital communication module.

9. The method of claim 1, further comprising:
determining that the microphone is disconnected or disabled; and
responsive to determining that the microphone is disconnected or disabled, enabling a second microphone to provide signals to the digital communication module.

10. The method of claim 1, wherein the first sidetone signal is generated by the analog communication module in response to a signal from the microphone of the aviation headset being above a threshold.

11. A headset for use in aviation, the headset comprising:
circuitry configured to interface with an analog communication module external to the headset; a digital communication module configured to communicate with a wireless-enabled device; and
a controller comprising one or more processing devices, the controller configured to:
receive a first signal representative of audio captured using a microphone in communication with the analog communication module;
compute a correlation between (i) a portion of the first feedback signal and (ii) at least a portion of the first signal;
determine that the computed correlation satisfies a threshold condition; and
responsive to determining that the computed correlation satisfies a threshold condition, determine that a first feedback signal from the analog communication module includes a first sidetone associated with the audio captured by the microphone; and
responsive to determining that the first feedback signal includes the first sidetone, generate at least one control signal configured to disable generation of a second sidetone by a digital communication module, determine an absence of sidetone in a second feedback signal from the analog communication module, and responsive to determining the absence of sidetone in the second feedback signal, enable one or more functions of the digital communication module.

12. The headset of claim 11, wherein the analog communication module is associated with an intercom system, and the digital communication module is configured to communicate with another headset.

13. The headset of claim 11, wherein the digital communication module comprises a peer-to-peer (P2P) communication engine.

14. The headset of claim 13, wherein the P2P communication engine comprises a Bluetooth® radio.

15. The headset of claim 11, wherein the at least one control signal is configured to disable the digital communication module.

16. The headset of claim 11, wherein the at least one control signal is configured to disable generation of a digital sidetone signal by the digital communication module.

17. The headset of claim 11, wherein the controller is configured to:
enable the microphone to provide signals to the digital communication module.

18. The headset of claim 11, wherein the controller is configured to:
determine that the microphone is disconnected or disabled; and
responsive to determining that the microphone is disconnected or disabled, enable a second microphone to provide signals to the digital communication module.

19. The headset of claim 11, wherein the controller is configured to:
determine that the headset is being accessed for use in a phone call; and
responsive to determining that the headset is being accessed for use in a phone call, disable one or more functions of the digital communication module such that the headset is usable for the phone call.

20. The headset of claim 19, wherein the controller is configured to:
determine that the headset is not being used for the phone call; and
responsive to determining that the headset is not being used for the phone call, automatically enable the one or more functions of the digital communication module that were disabled to make the headset usable for the phone call.

21. A machine-readable storage device having encoded thereon computer readable instructions for causing one or more processors to perform operations comprising:
receiving a first signal representative of audio captured using a microphone of an aviation headset in communication with an analog communication module;
determining that a first feedback signal from the analog communication module includes a first sidetone associated with the audio captured by the microphone;
computing a correlation between (i) a portion of the first feedback signal and (ii) at least a portion of the first signal;
determining that the computed correlation satisfies a threshold condition;
responsive to determining that the computed correlation satisfies a threshold condition, determining that the first feedback signal from the analog communication module includes the first sidetone;

responsive to determining that the first feedback signal includes the first sidetone, generating at least one control signal configured to disable generation of a second sidetone by a digital communication module; and determining an absence of sidetone in a second feedback signal from the analog communication module, and responsive to determining the absence of sidetone in the second feedback signal, enabling one or more functions of the digital communication module.

22. The machine-readable storage device of claim 21, wherein the at least one control signal is configured to disable the digital communication module.

23. The machine-readable storage device of claim 21, wherein enabling the one or more functions comprises enabling the digital communication module to communicate with a remote device.

* * * * *